United States Patent
Liu et al.

(10) Patent No.: US 8,069,709 B2
(45) Date of Patent: Dec. 6, 2011

(54) ION-BASED TRIPLE SENSOR

(75) Inventors: Yafeng Liu, Peoria, IL (US); Joseph William Furgerson, Peoria, IL (US); Jeffrey Ribordy, Peoria, IL (US); Dustin John Bequette, Metamora, IL (US); Kevin Everett, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 60 days.

(21) Appl. No.: 12/568,220

(22) Filed: Sep. 28, 2009

(65) Prior Publication Data
US 2010/0023277 A1 Jan. 28, 2010

Related U.S. Application Data

(62) Division of application No. 11/984,487, filed on Nov. 19, 2007, now Pat. No. 7,624,627.

(51) Int. Cl.
*G01M 15/05* (2006.01)
(52) U.S. Cl. .................. 73/114.08; 73/35.08
(58) Field of Classification Search ............. 73/35.08, 73/35.12, 114.02, 114.07, 114.08
See application file for complete search history.

(56) References Cited

U.S. PATENT DOCUMENTS

| | | | |
|---|---|---|---|
| 4,232,545 A | 11/1980 | Dobler et al. | |
| 4,446,724 A | 5/1984 | Focht | |
| 4,620,438 A | 11/1986 | Howng | |
| 4,648,367 A | 3/1987 | Gillbrand et al. | |
| 5,375,462 A | 12/1994 | Kuroda et al. | |
| 6,151,954 A | 11/2000 | Aoki et al. | |
| 6,439,029 B2 | 8/2002 | Asano et al. | |
| 6,520,142 B2 | 2/2003 | Nogi et al. | |
| 6,659,082 B1 | 12/2003 | Gruden et al. | |
| 6,722,343 B2 | 4/2004 | Uchida et al. | |
| 6,748,922 B2 | 6/2004 | Uchida et al. | |
| 6,789,409 B2 | 9/2004 | Tanaya | |
| 7,143,747 B2 | 12/2006 | Uchiyama | |
| 7,163,609 B2 | 1/2007 | Ando et al. | |
| 7,290,442 B2 * | 11/2007 | Zhu et al. ............. | 73/114.67 |
| 7,467,040 B2 * | 12/2008 | Ker et al. ............... | 701/102 |
| 7,472,687 B2 * | 1/2009 | Zhu et al. .............. | 123/406.34 |
| 7,747,380 B2 * | 6/2010 | Chauvin et al. ........ | 701/111 |
| 2003/0200789 A1 * | 10/2003 | Tanaya ................. | 73/35.08 |
| 2004/0230369 A1 | 11/2004 | Tanaya et al. | |
| 2005/0050948 A1 * | 3/2005 | Zhu et al. .............. | 73/117.3 |
| 2005/0092287 A1 | 5/2005 | Tozzi et al. | |
| 2007/0261475 A1 | 11/2007 | Allmendinger | |

* cited by examiner

*Primary Examiner* — Eric S McCall
(74) *Attorney, Agent, or Firm* — Finnegan, Henderson, Farabow, Garrett & Dunner LLP

(57) ABSTRACT

An ion-based triple sensor is disclosed. The ion-based triple sensor may include an ion sensing unit, configured to measure an ionic current intensity, a pressure sensing unit, configured to measure a pressure, and a temperature sensing unit, configured to measure a temperature. The ion-based triple sensor may further include a signal processing unit coupled to the ion sensing unit, the pressure sensing unit and the temperature sensing unit. The signal processing unit may include a filtering component, configured to filter at least one of the ion, pressure and temperature measurements, and a data acquisition component, configured to sample the filtered measurements and communicate the samples to a controller.

8 Claims, 4 Drawing Sheets

ION-BASED TRIPLE SENSOR

RELATED APPLICATIONS

This application is a divisional application of U.S. patent application Ser. No. 11/984,487, filed on Nov. 19, 2007, to ION-BASED TRIPLE SENSOR, the entire contents of which are hereby incorporated by reference.

TECHNICAL FIELD

This application relates to a sensor, and more particularly, to an ion-based triple sensor.

BACKGROUND

In a combustion chamber of a diesel engine as well as aftertreatment components, malfunctions of the air inlet valve, exhaust valve, and/or injector may lead to knock, misfiring, and out-of-phase combustion. To detect these malfunctions, an engine control module (ECM) usually relies on in-cylinder pressure measurements at particular crank angles. For example, pressure measurements may be obtained by a quartz pressure sensor installed in the combustion chamber or aftertreatment components. However, the measured pressure data are reliable only after averaging tens of engine cycles, and thus, result in significant delays in engine and/or aftertreatment component fault detection. The delay prevents the ECM from promptly adjusting control parameters to avoid catastrophic events of engine operation. Therefore, it is desirable that the sensor provides timely feedback to the ECM as early as the first engine cycle.

Furthermore, a chemical reaction status in the combustion chamber or an aftertreatment component may be indicated by multiple characteristic parameters, such as pressure, temperature, and ion current intensity. Therefore, it may be helpful that a sensor can measure these characteristic parameters at the same location and combine them to determine the unique chemical reaction condition. In addition, it may also be beneficial if the sensor has a self-validation function to monitor and detect sensor faults using its own measurements.

An apparatus for detecting knock in an internal combustion engine is described in U.S. Pat. No. 6,789,409 to Tanaya et al. ("the '409 patent"). The '409 patent describes an apparatus for accurately distinguishing knock from normal noise in the internal combustion engine. The apparatus includes an ion-current detection device for detecting an ion current flowing between the electrodes following combustion in the combustion chamber, a knock detection device for detecting knock occurring following an abnormal rise in either pressure or temperature in the combustion chamber, a center-of-gravity calculation device for calculating a gravity position of an ion current waveform, and a knock determination device for determining knock or noise based on outputs of the knock detection device and the center-of-gravity calculation device.

Although the knock detection apparatus described in the '409 patent may be effective for detecting knock in the internal combustion engine, it may be problematic. For example, the knock detection apparatus described in the '409 patent relies on an abnormal rise in either the steady-state pressure or the steady-state temperature to detect the knock, and thus may not be capable of providing timely and accurate feedback to the ECM shortly after startup, as the machine has not been operated long enough for the temperature or pressure sensor to reach steady-state operation. Furthermore, although the apparatus described in the '409 patent measures multiple characteristic parameters (e.g., ion current, pressure/temperature, etc.), these measurements are obtained from sensors that are located in different parts of the engine. As a result, the apparatus described in the '409 patent may not be able to determine a chemical reaction status corresponding to a single location, as the pressure measurement data may have been gathered from a different part of the engine than the ion current data. In addition, the apparatus described in the '409 patent may lack self-validation functions.

The disclosed ion-based triple sensor is directed towards overcoming one or more of the shortcomings set forth above.

SUMMARY

In one aspect, an ion-based triple sensor is disclosed. The ion-based triple sensor may include an ion sensing unit configured to measure an ionic current intensity, a pressure sensing unit configured to measure a pressure, and a temperature sensing unit configured to measure a temperature. The ion-based triple sensor may further include a signal processing unit coupled to the ion sensing unit, the pressure sensing unit and the temperature sensing unit. The signal processing unit may include a filtering component configured to filter at least one of the ion, pressure and temperature measurements, and a data acquisition component configured to sample the filtered measurements and communicate the samples to a controller.

In another aspect, an engine diagnostic method is disclosed. The engine diagnostic method may include acquiring an ionic current intensity signal, a pressure signal and a temperature signal in a combustion chamber of an engine, and determining an inherent response difference based on the acquired signals. The engine diagnostic method may further include determining a chemical reaction status in the combustion chamber, based on the inherent response difference. The engine diagnostic method may also include detecting an engine fault if the chemical reaction status is outside of a threshold range.

In yet another aspect, an ion-based triple sensor self-validation method is disclosed. The ion-based triple sensor self-validation method may include acquiring an ionic current waveform, and calculating at least one of a transient pressure value and a transient temperature value, based on the ionic current waveform. The ion-based triple sensor self-validation method may further include acquiring at least one of a steady-state pressure signal and a steady-state temperature signal. The ion-based triple sensor self-validation method may also include comparing the at least one transient value with a corresponding steady-state measurement, and detecting a fault associated with the ion-based triple sensor, if the difference between the transient value and the corresponding steady-state is outside of a threshold range.

DETAILED DESCRIPTION

Figure 1:
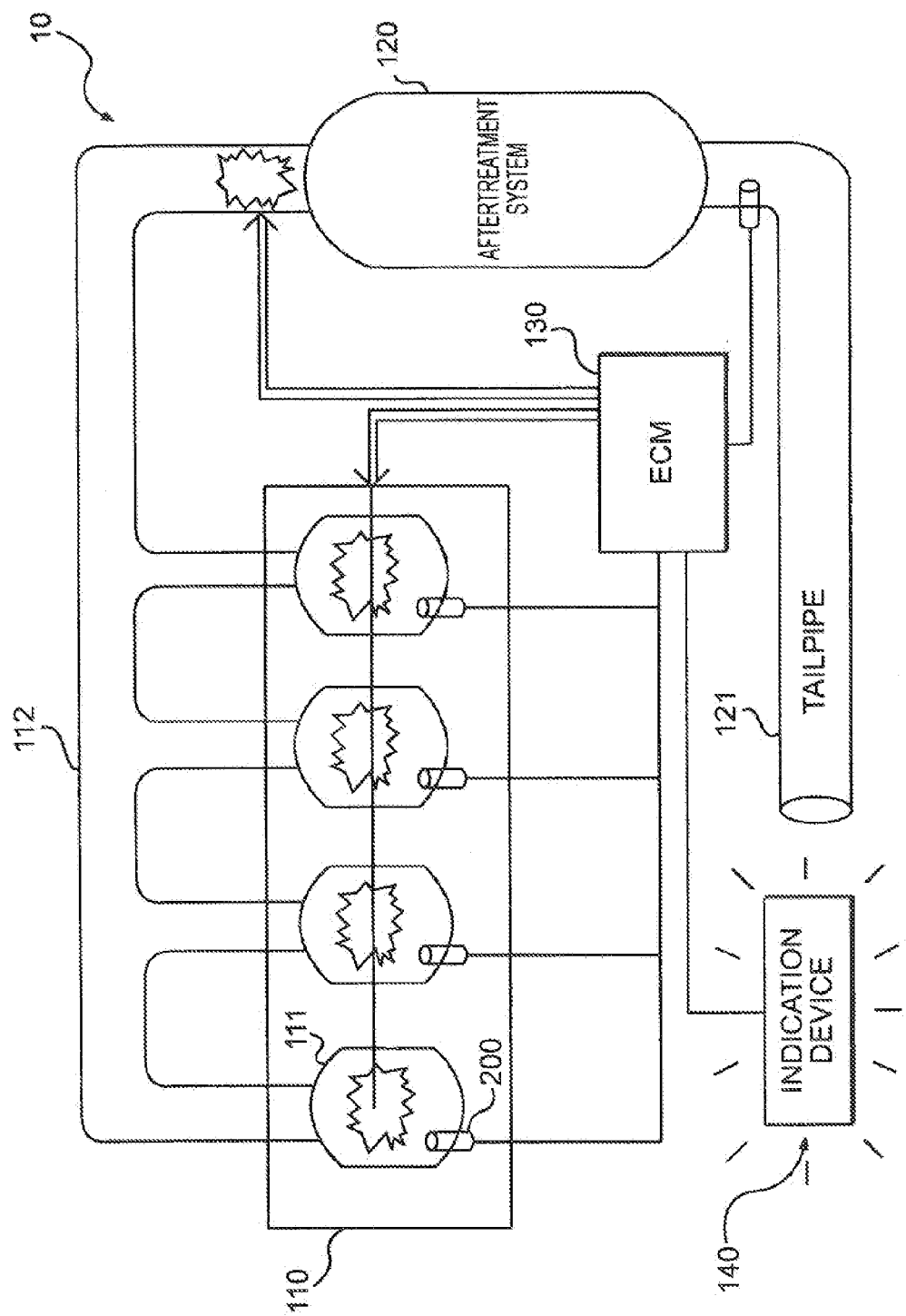
FIG. 1 provides a diagrammatic illustration of an engine combustion system, in accordance with an exemplary embodiment of the present disclosure.

FIG. 1 provides a diagrammatic illustration of an engine combustion system 10. Engine combustion system 10 may include, among other things, an engine 110, an aftertreatment system 120, an engine control module (ECM) 130, an indication device 140, and at least one ion-based triple sensor 200. Engine 110 may be any type of internal combustion engine such as, for example, a gasoline engine, a gaseous fuel-powered engine, or a diesel engine. Engine 110 may include an engine block that at least partially defines a plurality of combustion chambers 111. In the illustrated embodiment, engine combustion system 10 includes four combustion chambers 111. However, it is contemplated that engine 110 may include a greater or lesser number of combustion chambers 111 than is illustrated in FIG. 1. Furthermore, combustion chambers 111 may be disposed in any suitable geometric configuration or orientation, such as, for example, an "in-line" configuration, a "V" configuration, or any other suitable engine configuration or orientation.

Each combustion chamber 111 may include an air inlet valve, a fuel injector, and an igniter. The fuel injector may spray fuel into combustion chamber 111, and the air inlet valve may allow air flow into combustion chamber 111 to mix with the fuel. The igniter may facilitate ignition of the fuel and air mixture during an injection event. Heat generated by the fuel combustion results in a sliding motion of each piston within the respective combustion chamber 111. During operation of the engine described above, a complex mixture of air pollutants is produced as a byproduct of the combustion process and flows into aftertreatment system 120 via an exhaust passage 112. Malfunctions of the air inlet valve, fuel injector and/or igniter may lead to knock, misfiring, and out-of-phase combustion in combustion chamber 111, potentially resulting in abnormal or inefficient operation of the engine.

The air pollutants flowing out of the exhaust valve are composed of solid particulate matter and gaseous compounds which may include, among other things, nitrous oxides (NOx). Aftertreatment system 120 may include exhaust treatment components, including, a NOx trap, a diesel particulate trap (DPT), a three-way catalyst converter, an oxidized catalyst converter, etc. Chemical reactions, for example, selective catalyst reduction, may take place in these components to convert NOx into environmentally-friendly products, such as nitrogen gas and water. The aftertreatment products may exit the machine via a tailpipe 121. Malfunctions of exhaust components may lead to excessive particulate or gaseous emission discharge. If the emission discharge level exceeds limits established by a regulating body, engine combustion system 10 may become non-compliant with the emission regulations.

To facilitate the appropriate operation of engine combustion system 10, sensors may be installed in combustion chambers 111 and aftertreatment system 120 to measure one or more characteristic parameters indicative of the chemical reaction status. Examples of the characteristic parameter include ion current intensity, pressure, and temperature.

Ion current intensity refers to a current flow generated by the release of negatively charged ions resulting from chemical reactions in combustion chambers 111 and/or aftertreatment system 120. For example, because of the high temperatures and pressures that exist within combustion chambers 111, the combustion reaction often causes negatively charged ions associated with one or more of the chemicals to be released, generating a particular ion current. "Normal" operation of the engine typically exhibits an ion current with particular characteristics. By measuring the deviation of an ion current intensity from the one indicative of "normal" operation of the engine, a malfunction of an engine combustion process may be detected.

In addition to ion current intensity, temperature and pressure measurements associated with the chemical reactions may also be used to characterize and identify the status of chemical reactions associated with an engine system. For example, engine operation and, more specifically, engine combustion and aftertreatment status are correlated with the temperature and pressure of the chemical reactions used in each of the combustion and aftertreatment processes.

In fact, particular chemical reaction status information can often be more definitely and accurately derived from interrelationships between ion current intensity, pressure, and temperature associated with a chemical reaction. For example, "normal" engine operation may be characterized by a particular "signature" (referred to herein as the inherent response difference) characterized by an ion current intensity level at the corresponding temperature and pressure values. Similarly, a plurality of engine malfunctions may also be characterized by a unique relationship between ion current intensity, pressure, and temperature. By identifying and characterizing the unique "signatures" associated with normal engine operation and different engine operation malfunctions, problems associated with combustion or aftertreatment processes may be more easily diagnosed and corrected.

By way of example, a malfunction of the spark plug may generate a different ion current "signature" than, for example, a problem in the concentration of the air-fuel mixture. By measuring instantaneous changes in a local ion current surge, along with pressure and temperature data corresponding to the ion current surge, problems associated with the engine system may be identified. Furthermore, in order to properly locate and isolate problems in combustion and aftertreatment processes, it may be advantageous to gather the ion current intensity data, pressure data, and temperature data from precisely the same location (e.g., the same combustion chamber).

Consistent with the embodiment of the present disclosure, at least one ion-based triple sensor 200 may be installed in the combustion chambers 111 and/or aftertreatment system 120. Ion-based triple sensor 200 may be configured to measure an ion current intensity signal, a pressure signal, and a temperature signal, substantially simultaneously and in the same location. It is also contemplated that ion current intensity, pressure, and temperature may be measured in a non-simultaneous manner such as, for example, sequentially and/or periodically, at different time intervals.

Ion-based triple sensor 200 may be in communication with an engine control module (ECM) 130 via a communication harness. ECM 130 may include all the components required to run a control application such as, for example, a memory, a secondary storage device, and a processor, such as a central processing unit. One skilled in the art will appreciate that the ECM 130 may contain additional and/or different components than those listed above. ECM 130 may be dedicated to the control of engine combustion system 10, or may embody a general machine or power system microprocessor capable of controlling numerous machine or power system functions. ECM 130 may be associated with and/or include various other circuits such as, for example, power supply circuitry, signal conditioning circuitry, and solenoid driver circuitry, among others.

ECM 130 may be configured to receive the ion current intensity signal, the pressure signal, and the temperature signal and determine a unique chemical reaction status based on the signals received. According to one embodiment, ECM 130 may determine an inherent response difference among the three signals. The inherent response difference, as the term is used herein, refers to a combination of the chemical reaction status indications corresponding to the three signals that define the ion current intensity, pressure, and temperature "signature" associated with the chemical reaction. For example, one common combustion system malfunction, commonly referred to as shock-fault, occurs when the air-fuel mixture in combustion chambers 111 prematurely combusts in the combustion system. An ion current surge indicative of the shock fault may be detected by ion-based triple sensor 200. Meanwhile, pressure and temperature may also be measured. ECM 130 may combine these indications and map the inherent response difference to a unique status of the engine in-cylinder combustion and aftertreatment components.

Those skilled in the art will recognize that, during the first few engine cycles, there may be a delay in the accuracy of the measured temperature and pressure data. Due to the averaging effect, a certain amount of time may be required for the temperature and pressure measurements to reach steady-state. Accordingly, in order to accurately monitor chemical reaction status immediately after engine start-up, pressure and temperature data may be calculated using ion current data. For example, ion-based triple sensor 200 may measure an ion current waveform. Based on ion current waveform, ECM 130 may determine a chemical reaction rate using, for example, a modified Arrhenius equation. With the determined chemical reaction rate, ECM 130 may operate to solve for at least one of a transient pressure value and at transient temperature value, from a set of equations. Transient pressure and transient temperature refer to pressure and temperature data calculated by ECM 130, based on a chemical reaction rate derived with ion current intensity measurements. Transient temperature and transient pressure are used primarily during the first few engine cycles, when temperature and pressure sensors are unable to accurately detect steady-state temperature and pressure values. In contrast, steady-state temperature and steady-state pressure refer to temperature and pressure once the temperature and pressure sensors have reached steady-state operation, after warm-up of the engine.

Consistent with the disclosed embodiment, the set of equations may include a chemical reaction rate equation, a global potential minimizer for equilibrium, a stoichiometric chemical reaction equation, a pressure conservation equation, and a state equation, wherein the rate equation may be defined as follows:

$$\text{rate} = k_0 \cdot T^n \cdot \exp(-E_a/R \cdot T) \cdot [A]^x \cdot [B]^y$$

In the equation, A and B are the two species involved in the chemical ionic non-reverse reaction, and x and y are stoichiometric coefficient for species A and species B respectively. [ ] denotes concentration of the species, which can be determined by dividing species partial pressure by total pressure. T denotes the temperature. Other constants in the equation include a pre-exponential factor $k_0$, a constant n, activation energy $E_a$, and gas constant R. In the equation, the chemical reaction rate is previously determined based on the ion current intensity measurements. Temperature and species concentrations are unknowns to be solved. Pressure may be further derived from the solved species concentrations.

Unlike the measured pressure and temperature that are quasi steady-state, the solved pressure and temperature are transient and indicative of the real values at the sensor location. With these transient parameters, as well as the measured ion current intensity, ECM 130 may determine a transient status of the chemical reaction and diagnose possible combustion and/or aftertreatment malfunctions.

According to yet another embodiment, ECM 130 may also be configured to compare the solved transient pressure and temperature values with the measured steady-state pressure and temperature signals in order to validate that the at least one ion-based triple sensor 200 is operating appropriately. If the differences between the transient values and the steady-state measurements are greater than predetermined thresholds, ECM 130 may determine that a fault exists in ion-based triple sensor 200. Therefore, the operation of ion-based triple sensor 200 may be validated with its own measurements.

ECM 130 may be coupled to and in communication with injectors and/or igniters in the combustion chambers 111. Based on the multiple characteristic parameters provided by the at least one ion-based triple sensor 200, together with other input received by ECM 130 including, among other things, engine speed, engine load, emissions production or output, and engine fuel consumption rate, ECM 130 may direct a control current to each injector and/or igniter to adjust the injection and/or ignition timing, injection mode (with or without pilot), and injection quality.

An indication device 140 may be operatively coupled to ECM 130, and configured to provide a warning signal indicative of malfunctions of engine combustion system 10 and/or at least one ion-based triple sensor 200. For instance, indication device 140 may include any component configured to provide a warning signal to an operator of engine combustion system 10. Non-limiting examples of indication device 140 may include a visual device (e.g., warning lamp, LCD display, LED lamp, etc.); an audible device (e.g., speaker, bell, chime, etc.); a wireless device (e.g., cell phone, pager, etc.); or any other type of output device.

Consistent with one embodiment of the present disclosure, indication device 140 may be a display device, for example, a computer, an operator panel, or an LCD for displaying faults associated with engine 110 and/or aftertreatment system 120. For example, indication device 140 may include a screen that displays the fault on the screen. The fault notice may be displayed as a diagrammatic chart including a configuration of the engine combustion system 10, with graphic views of engine and aftertreatment components as well as the at least one ion-based triple sensor. Faulty components may be illuminated, highlighted, or otherwise marked in a notable manner.

Figure 2:
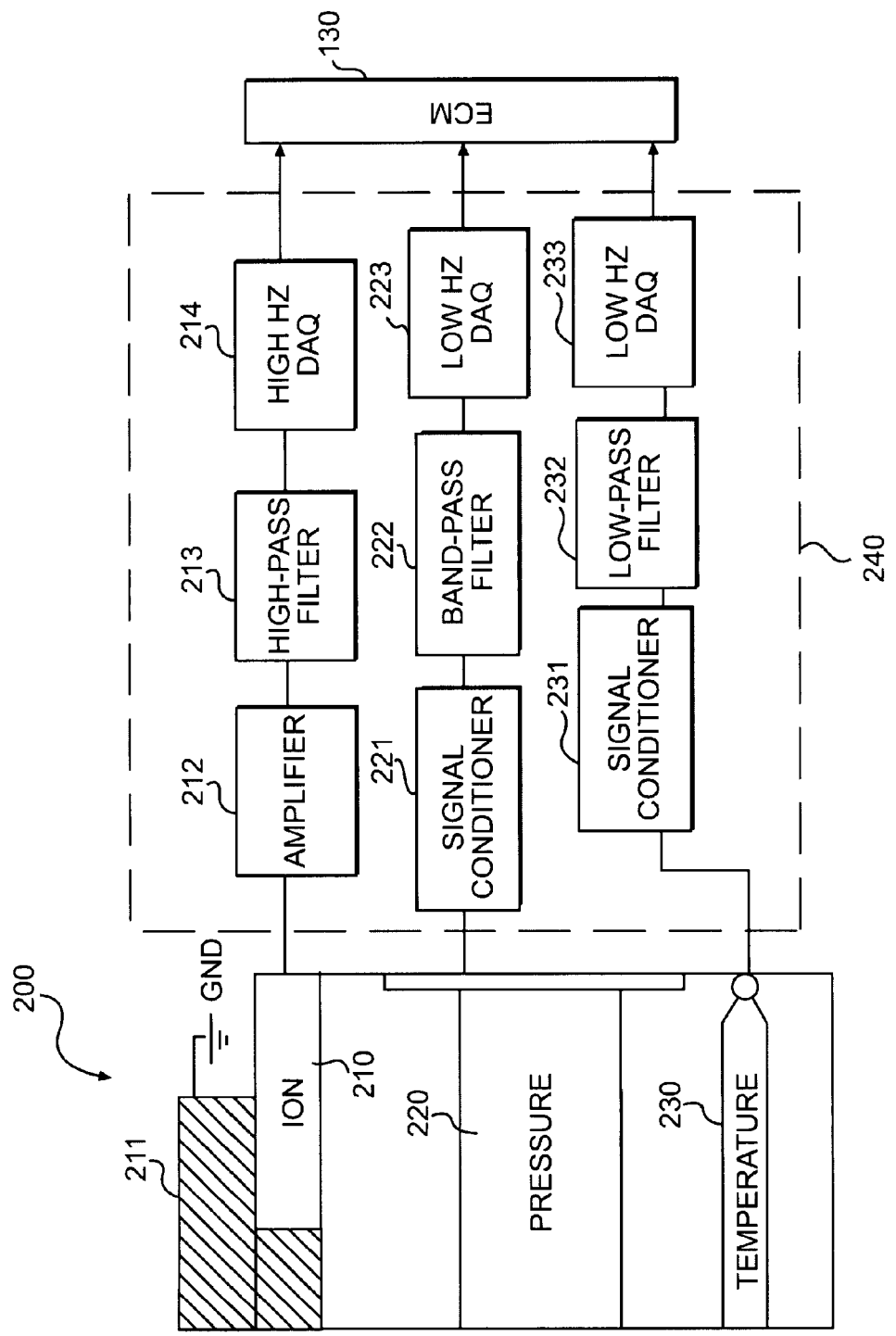
FIG. 2 provides a diagrammatic illustration of an ion-based triple sensor, in accordance with an exemplary embodiment of the present disclosure.

FIG. 2 provides a diagrammatic illustration of an ion-based triple sensor, in accordance with an exemplary embodiment of the present disclosure. As illustrated in FIG. 2, ion-based triple sensor 200 may include, among other things, an ion sensing unit 210, a pressure sensing unit 220, a temperature sensing unit 230, and a signal processing unit 240 coupled to each sensing unit.

Ion sensing unit 210 may include a metal wire (not shown) with an exposed portion not covered with an insulating material, and an insulation component 211 that insulates ion sensing unit 210 from other parts of ion-based triple sensor 200. Ion sensing unit 210 may be configured to detect a variation in current at the metal wire by applying a predetermined voltage thereto wherein the exposed portion is arranged in the combustion chamber as a heat-sensitive portion. The fast response of ion sensing unit 210 makes it capable of capturing transient ionic current surge. For example, ion sensing unit 210 may detect an engine shock immediately after it initiates in combustion chambers 111.

Pressure sensing unit 220 and temperature sensing unit 230 may include respective pressure and temperature sensing devices known to those skilled in the art. Pressure sensing unit 220 and temperature sensing unit 230 may be compactly integrated with ion sensing unit 210 such that the size of ion-based triple sensor is minimized. Furthermore, the three sensing units may be carefully positioned and shielded from each other such that the signal interference among the three units is eliminated.

Signal processing unit 240 may include an ion signal processing component coupled to ion sensing unit 210, a pressure processing component coupled to pressure sensing unit 220, and a temperature processing component coupled to pressure sensing unit 220. The ion signal processing unit may include an amplifier 212, a high-pass filter 213, and a high frequency data acquisition (DAQ) unit 214. Ion current is typically in the range of several micro-amperes to hundreds of micro-amperes. Therefore, the ion current signal acquired by ion sensing unit 210 may be amplified by amplifier 212. The oscillating signal portion in the ion current that corresponds to an abnormal reaction status is usually high-frequency. In order to extract the high frequency portion of the signal, the amplified signal may be fed into high-pass filter 213. Accordingly, high frequency DAQ 214 may be configured to sample the filtered ion current signal at a high frequency.

The pressure signal processing unit may include a signal conditioner 221, a band-pass filter 222, and a low frequency data acquisition (DAQ) unit 223. Signal conditioner 221 may be configured to reduce noises and abnormal spikes in the pressure signal acquired by pressure sensing unit 210. The pressure signal may then be fed into band-pass filter 222, where the extremely low frequency and extremely high frequency portions are removed. The filtering process may have an equivalent effect as averaging and the filtered pressure measurement becomes quasi steady-state. Low frequency DAQ 214 may be configured to sample the filtered pressure signal at a low frequency.

Similar to the pressure sensing unit, the temperature signal processing unit may include a signal conditioner 231, a low-pass filter 232, and a low frequency data acquisition (DAQ) unit 233. The conditioned temperature signal may be fed into low-pass filter 232, where the high frequency portion of the signal may be removed, and then sampled at a low frequency. Signal processing unit 240 may be operatively coupled to ECM 130 and configured to transmit the sampled ion current signal, pressure signal and temperature signal to ECM 130.

INDUSTRIAL APPLICABILITY

Although the disclosed embodiments are described in association with a combustion engine and its aftertreatment system, the disclosed triple sensor may be used in any environment where it may be desirable to monitor the status of a chemical reaction. Specifically, the disclosed triple sensor may measure an ion current intensity, a pressure and a temperature in a chamber where a chemical reaction is taking place, and determine a status of the chemical reaction based on the measurements. Moreover, the disclosed triple sensor may be configured to provide indications when a fault is detected. In addition, the disclosed triple sensor may perform self-validations based on the measured signals.

Figure 3:
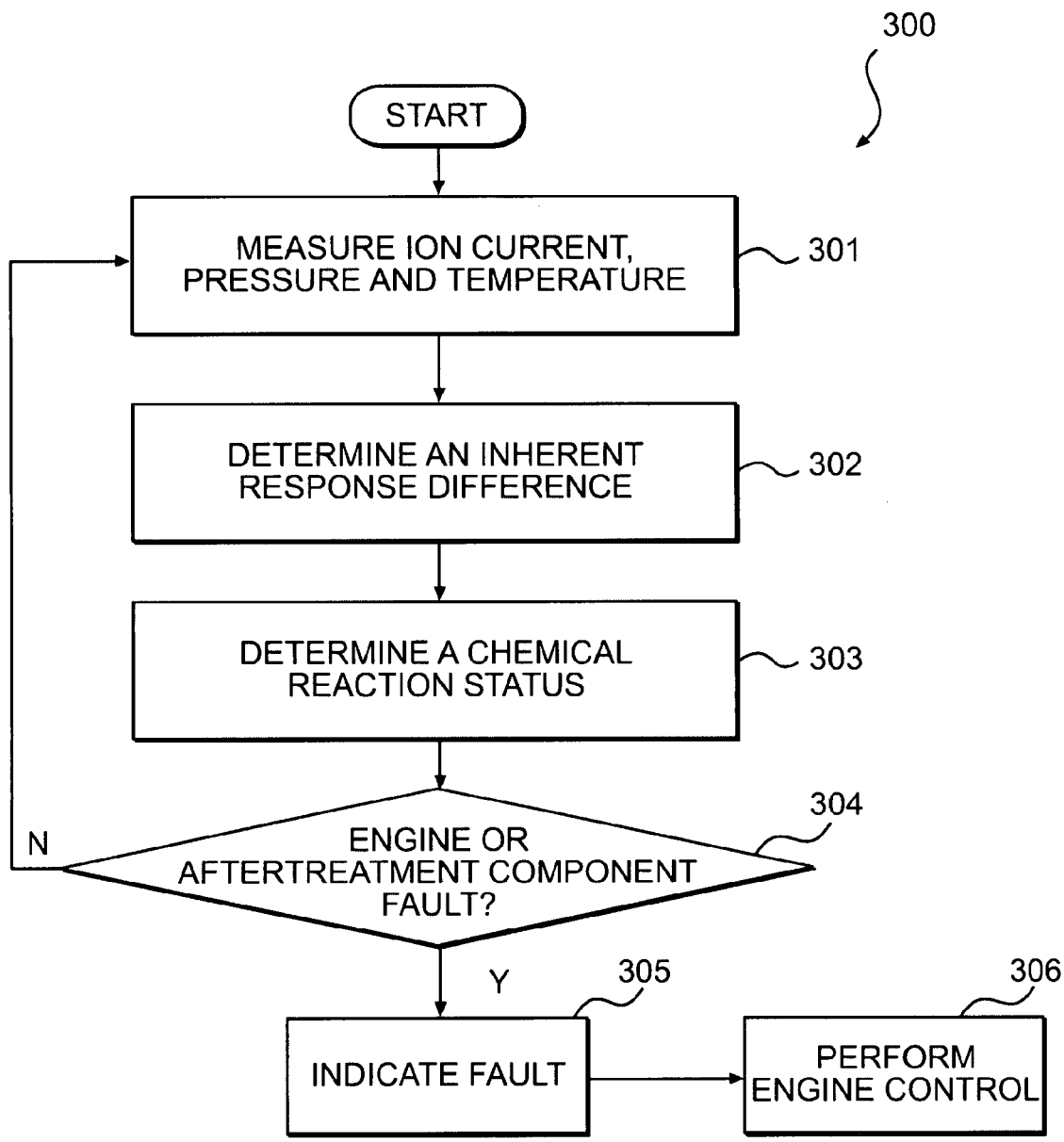
FIG. 3 provides a flowchart of an exemplary combustion fault detection process of an ion-based triple sensor, in accordance with the embodiment of the present disclosure.

FIG. 3 provides a flowchart of an exemplary combustion fault detection process 300 of an ion-based triple sensor 200, in accordance with the embodiment of the present disclosure. Process 300 may include measuring an ion current intensity signal, a pressure signal and a temperature signal (Step 301). The measurement may be performed as early as within the first engine cycle. The ion signal may include information of an ion current surge, which may be indicative of a shock incidence in the combustion chamber or aftertreatment components.

Process 300 may further determine an inherent response difference among the three measurements (Step 302). For example, the inherent response difference may be high ion current with low pressure and low temperature, or high ion current with high pressure and low temperature. Based on the inherent response difference, process 300 may determine a chemical reaction status (Step 303) and determine accordingly whether an engine or aftertreatment component fault exists (Step 304). For example, an inherent response difference of high ion current with low pressure and low temperature may correspond to an early stage combustion shock fault.

If a fault is detected, process 300 may further indicate the fault to a user of the machine (Step 305). The indication may be in the form of a warning signal or, alternatively, a fault display on a screen. Service suggestions to eliminate the fault may also be included with the indication. Process 300 may also adjust engine control parameters based on the chemical reaction status to improve combustion (Step 306). Examples of engine control parameters may include injection and/or ignition timing, injection mode, and injection quality. Engine control in step 306 may involve shutting down the engine for trouble-shooting responsive to a fatal fault. If no fault is detected (Step 304: No), process 300 may repeat Steps 301-304 to continuously monitor the chemical reaction status.

For example, process 300 may be used to detect the backfire inside the tailpipe or at the tailpipe exit. Due to extensive convective heat loss along the length of exhaust piping system, the heat generated by backfire may not cause immediate temperature or pressure increase, but the ion intensity may be easily detected. ECM 130 may execute process 300 to perform a diagnosis based on the inherent response difference between the ion current intensity signal and the temperature signal. If a backfire is detected, process 300 may determine control strategies to mitigate or eliminate the backfire.

Figure 4:
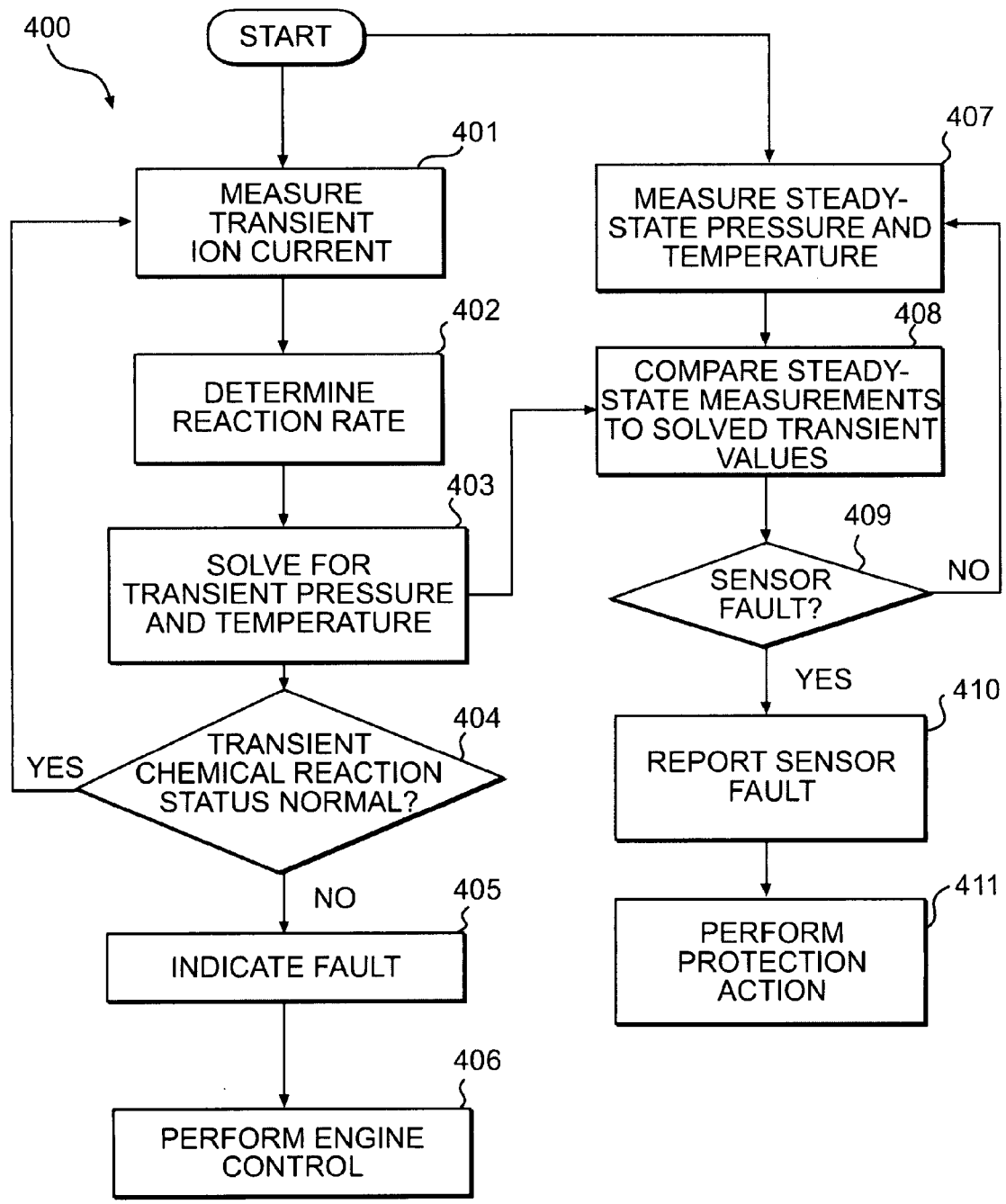
FIG. 4 provides a flowchart of an exemplary combustion fault detection and self-validation process of an ion-based triple sensor, in accordance with the embodiment of the present disclosure.

FIG. 4 provides a flowchart of another exemplary combustion fault detection and self-validation process 400 of an ion-based triple sensor, in accordance with the embodiment of the present disclosure. Process 400 may measure a transient ion current waveform (Step 401). Based on the temporal ion signal, a reaction rate may be determined (Step 402). The transient pressure and temperature may be solved, from a set of equations including a chemical reaction rate equation, a global potential minimizer for equilibrium, a stoichiometric chemical reaction equation, a pressure conservation equation, and a state equation (Step 403). With the solved pressure and temperature, as well as the measured ion current intensity, process 400 may determine a transient status of the chemical reaction and diagnose possible transient malfunctions in any combustion and/or aftertreatment components (Step 404). If a fault is detected, process 400 may further indicate the fault and step 406 to perform engine controls (Step 405), similar to Steps 305 and 306 disclosed in FIG. 3.

Parallel to combustion fault detection Steps 405-406, process 400 may also measure steady-state pressure and temperature signals (Step 407). The measured steady-state pressure and temperature signals may be compared to the solved transient pressure and temperature (Step 408). Process 400 may further validate the operation of ion-based triple sensor 200 based on the comparison differences (Step 409). If a sensor fault is found (Step 409: Yes), process 400 may report the sensor fault to the user of the machine (Step 410) and operate ECM 130 to perform necessary protection actions (Step 411410). If no fault is detected (Step 409: No), process 400 may repeat Steps 407-409 to continuously monitor the operation of ion-based triple sensor 200.

Ion-based triple sensor 200 and corresponding combustion control strategies in the present disclosure may provide timely feedback to ECM 130 as early as the first engine cycle. The sensor measurements may indicate engine or aftertreatment component faults immediately after the combustion process starts. Based on sensor measurements, ECM 130 may timely adjust control parameters, for example, injection timing, mode and quantity, to regulate and optimize the combustion process. Therefore, the disclosed ion-based triple sensor 200 and corresponding control strategies may serve as diagnostic tools to prevent catastrophic events from occurring in the combustion chamber. Moreover, ion-based triple sensor 200 and associated control strategies may further serve as research tools to improve engine combustion research. For example, the characteristic parameters measured during the early stages of engine combustion may provide valuable information to improve the injection timing, injection quantity, multi-pulse injection, spark timing, spark duration for better engine performance and emission.

Furthermore, ion-based triple sensor 200 may compactly integrate ion sensing unit 210, pressure sensing unit 220, and temperature sensing unit 230 without interference. Therefore, the sensor may accurately measure the three characteristic parameters at the same location. In addition, ion-based triple sensor 200 may provide improved reliability due to its self-validation functions.

It will be apparent to those skilled in the art that various modifications and variations can be made to the disclosed ion-based triple sensor and corresponding control strategies without departing from the scope of the disclosure. Other embodiments of the present disclosure will be apparent to those skilled in the art from consideration of the specification and practice of the present disclosure. It is intended that the specification and examples be considered as exemplary only, with a true scope of the present disclosure being indicated by the following claims and their equivalents.

What is claimed is:

1. An engine diagnostic method, comprising:
    acquiring an ionic current intensity signal, a pressure signal and a temperature signal in a combustion chamber of an engine;
    determining an inherent response difference based on the acquired signals;
    determining a chemical reaction status in the combustion chamber, based on the inherent response difference; and
    detecting an engine fault if the chemical reaction status is outside of a threshold range.

2. The method of claim 1, further including acquiring an ionic current intensity signal, a pressure signal and a temperature signal in an aftertreatment component.

3. The method of claim 1, further including high-pass filtering the ionic current intensity signal and low-pass filtering at least one of the pressure signal and temperature signal.

4. The method of claim 1, further including:
    calculating a transient pressure value and a transient temperature value; and
    determining the chemical reaction status in the combustion chamber, based on at least one of the transient pressure and temperature values.

5. The method of claim 4, wherein calculating includes:
    acquiring a transient ionic current waveform;
    deriving a chemical reaction rate in the combustion chamber of the engine, based on the acquired ionic current waveform; and
    solving for the transient pressure value and the transient temperature value from a set of equations.

6. The method of claim 5, wherein the set of equations include at least two of:
    a chemical reaction rate equation with the derived chemical reaction rate plugged in;
    a global potential minimizer for equilibrium;
    a stoichiometric chemical reaction equation;
    a pressure conservation equation; and
    a state equation.

7. The method of claim 4, wherein detecting an engine fault includes detecting the engine fault based on the at least one of the transient pressure and temperature values.

8. The method of claim 1, further including adjusting one or more engine control parameters based on the determined chemical reaction status and a desired chemical reaction status.

* * * * *